(12) United States Patent
Milvaney et al.

(10) Patent No.: US 10,353,926 B2
(45) Date of Patent: Jul. 16, 2019

(54) UNIFIED ACTIVITY SERVICE

(71) Applicant: Microsoft Technology Licensing, LLC, Redmond, WA (US)

(72) Inventors: Douglas L. Milvaney, Cambridge, MA (US); Andrew W. Harris, Somerville, MA (US); Candy Hoi Mei Wong, Cambridge, MA (US); Manish Kumar Shukla, Lexington, MA (US); Daniel J. Chattan, Ipswich, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 551 days.

(21) Appl. No.: 14/943,191

(22) Filed: Nov. 17, 2015

(65) Prior Publication Data
US 2017/0140025 A1    May 18, 2017

(51) Int. Cl.
*G06F 16/28* (2019.01)
*G06F 16/2457* (2019.01)
*G06F 16/16* (2019.01)
*G06F 17/22* (2006.01)
*G06Q 10/10* (2012.01)
*G06F 15/16* (2006.01)

(52) U.S. Cl.
CPC ........ *G06F 16/285* (2019.01); *G06F 16/164* (2019.01); *G06F 16/24573* (2019.01); *G06F 17/2211* (2013.01); *G06Q 10/101* (2013.01)

(58) Field of Classification Search
CPC .......... G06F 17/30525; G06F 17/3012; G06F 17/30598; G06F 16/24573; G06F 16/164; G06F 16/285

USPC ....................................................... 707/737
See application file for complete search history.

(56) References Cited

U.S. PATENT DOCUMENTS

| | | | | |
|---|---|---|---|---|
| 6,671,757 B1 * | 12/2003 | Multer | ............... | H04L 67/1095 707/999.201 |
| 7,596,571 B2 * | 9/2009 | Sifry | ................... | G06F 17/3089 707/999.01 |
| 7,747,557 B2 | 6/2010 | Sareen et al. | | |

(Continued)

FOREIGN PATENT DOCUMENTS

WO    2014055613 A1    4/2014

OTHER PUBLICATIONS

"International Search Report and Written Opinion Issued in PCT Application No. PCT/US2016/061751", dated Jan. 19, 2017, 12 Pages.

(Continued)

*Primary Examiner* — Usmaan Saeed
*Assistant Examiner* — Brian E. Weinrich

(57) ABSTRACT

Aspects of the present disclosure relate to a unified activity service. In one aspect, different files stored on different storage platforms may be rendered on different user interfaces. Multiple activities associated with each of the different files may be obtained from the activity service. In another aspect, activity metadata corresponding to the multiple activities may be stored in the activity service. Activities associated with the different files may include content changes in a file (e.g., edits and deletions), sharing a file, renaming a file, comments within a file, messaging, and conversations related to a file. The different storage platforms may be independent of the activity service.

20 Claims, 6 Drawing Sheets

(56) References Cited

U.S. PATENT DOCUMENTS

| | | | |
|---|---|---|---|
| 7,797,335 B2* | 9/2010 | Stern | G06F 17/30115 |
| | | | 707/713 |
| 8,051,483 B2 | 11/2011 | Fang et al. | |
| 8,117,246 B2* | 2/2012 | Sadovsky | G06F 17/30035 |
| | | | 707/899 |
| 8,447,801 B1* | 5/2013 | Roche | G06F 17/30206 |
| | | | 707/736 |
| 8,484,260 B2 | 7/2013 | Caso et al. | |
| 8,983,947 B2 | 3/2015 | Riedel et al. | |
| 2007/0255754 A1* | 11/2007 | Gheel | G06F 17/30867 |
| | | | 707/999.107 |
| 2009/0125518 A1* | 5/2009 | Bailor | G06F 17/24 |
| | | | 707/999.008 |
| 2010/0088299 A1* | 4/2010 | O'Sullivan | G06F 17/30719 |
| | | | 707/705 |
| 2012/0192055 A1* | 7/2012 | Antebi | G06F 17/30206 |
| | | | 715/229 |
| 2013/0014023 A1 | 1/2013 | Lee et al. | |
| 2013/0262373 A1* | 10/2013 | Rampson | G06Q 10/10 |
| | | | 707/608 |
| 2013/0297680 A1* | 11/2013 | Smith | H04L 29/08117 |
| | | | 709/203 |
| 2014/0082463 A1* | 3/2014 | Sitrick | G06F 17/212 |
| | | | 715/202 |

OTHER PUBLICATIONS

Donnelly, Dave, "Deep Dive: The Document APIs Overview", Retrieved on: Sep. 4, 2015, Available at: http://support.scorm.com/entries/68845730-Deep-Dive-The-Document-APIs-Overview.

"Second Written Opinion Issued in PCT Application No. PCT/US2016/061751", dated Oct. 24, 2017, 5 Pages.

"International Preliminary Report on Patentability Issued in PCT Application No. PCT/US2016/061751", dated Jan. 23, 2018, 6 Pages.

\* cited by examiner

UNIFIED ACTIVITY SERVICE

BACKGROUND

Computer and software users have grown accustomed to user-friendly software applications for co-authoring files, documents, messages, and the like. For example, storage providers (e.g., cloud storage providers) provide applications such as word processing applications, spreadsheet applications, electronic slide presentation applications, email applications, chat applications, voice applications, and the like, where users can co-author and collaborate with one another within the applications. Current entities and/or storage providers that provide collaboration experiences require that applications, files, and/or metadata about the applications and/or files be stored on the entity's service and/or storage itself. That is, the file contents and the metadata about the file are both stored in the same location and tied to the entity service and/or storage provider. In turn, current techniques for providing application collaboration experiences may be slow, inefficient, and require users to collaborate within and store applications tied to a particular storage provider.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to a unified activity service for collaboration experiences. In one aspect, a file stored on a first storage platform may be rendered on a first user interface. One or more activities associated with the file may be obtained from the activity service. The one or more activities may include associated activity metadata. Another file stored on a second storage platform may be rendered on a second user interface. One or more activities associated with the another file may be obtained from the activity service. The one or more activities may include associated activity metadata.

In another aspect, receiving an indication of an occurrence of at least one activity associated with a file may be received. Activity metadata corresponding to the at least one activity associated with the file may be generated. The generated activity metadata may be sent to the activity service for storing the generated activity metadata. In some examples, the file may be stored independently of the activity service.

In yet another aspect, activity metadata corresponding to at least one activity associated with a file stored on a first storage platform may be received at an activity service. The activity metadata corresponding to the at least one activity associated with the file stored on the first storage platform may be stored. Activity metadata corresponding to at least one activity associated with another file stored on a second storage platform may be received at the activity service. The activity metadata corresponding to the at least one activity associated with the another file stored on the second storage platform may be stored.

DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
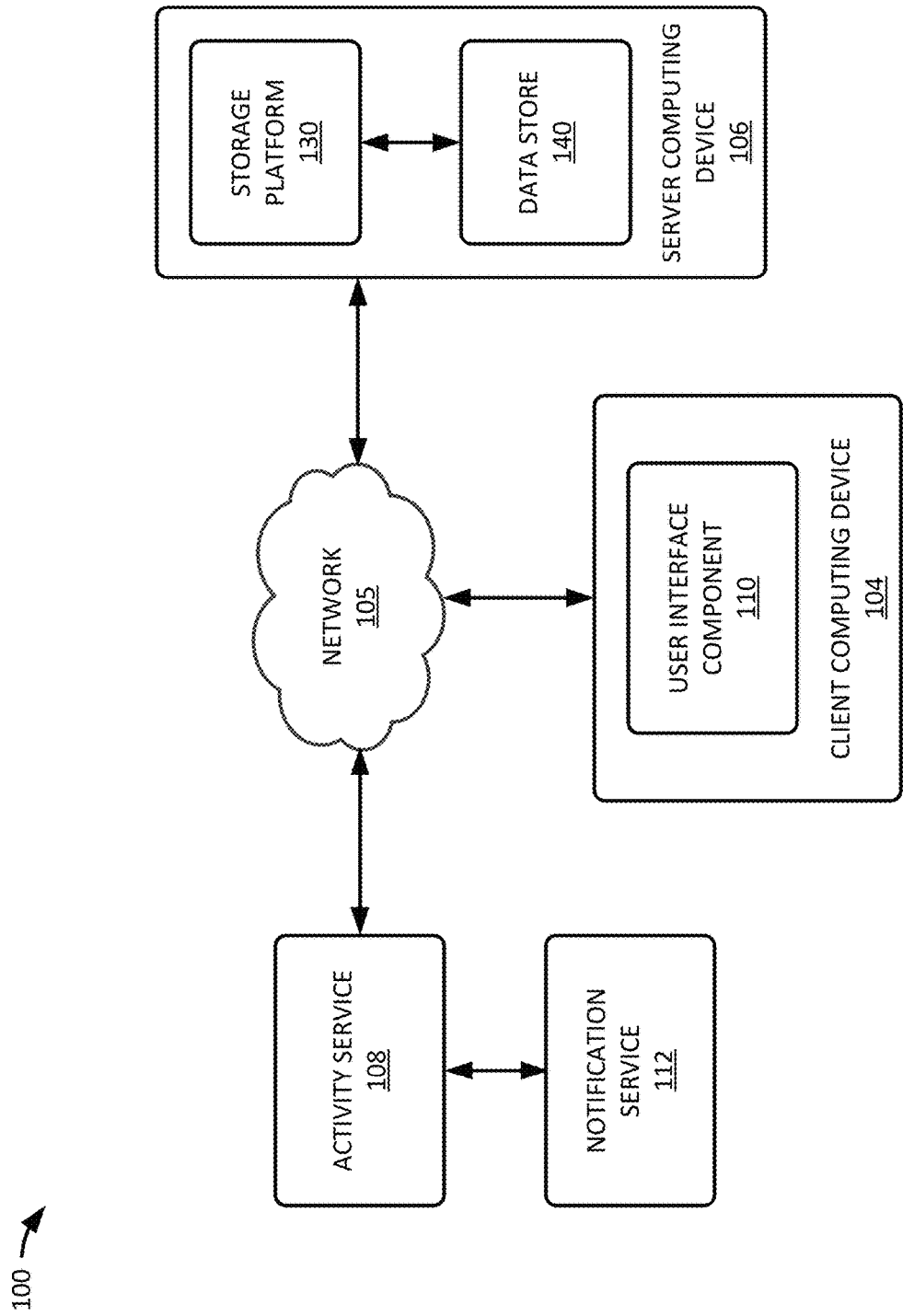
FIG. 1 illustrates an exemplary unified activity system, according to an example aspect.

Aspects of the disclosure are generally directed to a unified activity service for enabling rich collaboration experiences. For example, the unified activity service may be configured to store activity metadata such that a plurality of entities may write activity metadata to the unified activity service and consume the activity metadata from the unified activity service. The activity metadata may correspond to one or more activities associated with a file and/or a plurality of files. In some examples, activities associated with the file may include activities such as content changes in the file (e.g., edits and deletions), sharing the file, renaming the file, comments within the file, messaging, and the like. In some examples, activities associated with the file may include activities that surround the file and may include activities such as conversations around the document (e.g., email communications and/or messaging communication that discuss and/or reference the file), and the like.

In some cases, the plurality of entities that may write activity metadata to the unified activity service and consume the activity metadata from the unified activity service include at least client computing devices, storage platforms, and/or any third party entities that are independent of the unified activity service. For example, a file associated with an application may be rendered on a user interface of a first client computing device. In one case, the file may be stored on a storage platform. When an activity has occurred within the file (e.g., a user edits the file), the activity metadata (e.g., a type of activity, an identifier, and a timestamp) corresponding to the edit may be sent/written to the activity service by the first client computing device. In another example, the storage platform that stores the file may write/send the activity metadata to the activity service.

In some cases, the file may be rendered on a second client computing device. When the file is rendered on the second client computing device, a request for one or more activities associated with the file may be sent to the activity service. The one or more activities (and associated activity metadata) may be received from the activity service and displayed in a file activity feed within the file rendered on the second client computing device. Using the example described above, the edits and associated metadata that occurred within the file on the first client computing device may be displayed in the file activity feed within the file on the second client computing device. In this example, the file is stored in a storage platform, the activity metadata is stored in the activity service, and the first and second client computing devices consume the activity metadata from the activity service. In this regard, the file itself and its storage platform are independent of the activity metadata. As such, the activity service stores and processes data about a file, for example, independently of the file itself and its storage platform.

In another case, the activity service may receive and store activity metadata associated with a first file stored on a first storage platform and activity metadata associated with a second file stored on a second storage platform. For example, a first entity may use the first storage platform for collaborating within applications and/or files associated with the application. A second entity may use the second storage platform for collaborating within applications and/or files associated with the application. However, in either case, co-authors of files hosted by the first storage platform and co-authors of files hosted by the second storage platform may create and consume one or more activities associated with the files using the activity service regardless of which storage platform is hosting the file. In this regard, co-authors collaborating on files will have the same collaboration experience independent of the storage platform hosting the files. In other cases, a third party entity may consume one or more activities (and the associated activity metadata) from the activity service. For example, a third party entity may consume the one or more activities to provide a summary of the one or more activities and/or to provide analytics around the one or more activities independent of the file itself. That is, the one or more activities associated with a file may be provided to and used by a third party entity that is independent of the storage platform hosting the file.

As discussed above, current entities and/or storage providers that provide collaboration experiences require that applications, files, and/or metadata about the applications and/or files be stored on the entity's service and/or storage itself. That is, the file contents and the metadata about the file are both stored in the same location and tied to the entity service and/or storage provider. In turn, current techniques for providing application collaboration experiences may be slow, inefficient, and require users to collaborate within and store applications tied to a particular storage provider.

Accordingly, aspects described herein include a unified activity service for storing activity metadata associated with files independently of the files themselves and/or the storage platforms hosting the files. In this regard, a file stored on a first storage platform may be rendered on a first user interface. One or more activities associated with the file may be obtained from the activity service. The one or more activities may include associated activity metadata. In some cases, the one or more activities associated with the file may be displayed in a file activity feed within the file. Another file stored on a second storage platform may be rendered on a second user interface. In some cases, the first user interface and the second user interface are the same such that both the file stored on the first storage platform and the other file stored on the second storage platform are rendered on the same client computing device. In other cases, the file stored on the first storage platform and the other file stored on the second storage platform may be rendered on different client computing devices. One or more activities associated with the other file (stored on the second storage platform) may be obtained from the activity service. The one or more activities may include associated activity metadata. In some cases, the one or more activities associated with the other file may be displayed in a file activity feed within the other file. In this regard, a technical effect that may be appreciated is that the same compelling visual and functional collaboration experience is enabled across multiple platforms for each file and/or user/co-author independently of the storage platforms hosting the files.

Further aspects described herein include storing activity metadata in the unified activity service. For example, activity metadata corresponding to at least one activity associated with a file stored on a first storage platform may be received at the activity service. In one case, the activity metadata may be generated by and sent from the first storage platform. In another case, the activity metadata may be generated by and sent from a client computing device rendering the file stored on the first storage platform. The activity metadata may be generated in response to an indication of an occurrence of the at least one activity associated with the file. The activity metadata corresponding to the at least one activity associated with the file stored on the first storage platform may be stored within the activity service. In some cases, the activity itself and/or content of the activity may be received at and stored by the activity service. For example, if the activity includes an edit to the file, the edit itself may be received at and stored by the activity service.

In another example, activity metadata corresponding to at least one activity associated with another file stored on a second storage platform may be received at the activity service. In one case, the activity metadata may be generated by and sent from the second storage platform. In another case, the activity metadata may be generated by and sent from a client computing device rendering the other file stored on the second storage platform. The activity metadata corresponding to the at least one activity associated with the other file stored on the second storage platform may be stored within the activity service. In this regard, the activity service stores activity metadata (e.g., data about and/or around a file) independently of the file itself and the storage platform hosting the file. Additionally, the activity service is accessible to co-authors of a file, the storage platforms hosting the files, and/or third party entities. As such, file activities may be easily accessible outside of the file itself. Accordingly, another technical effect that may be appreciated is that users/co-authors of a file, storage platforms, and/or third party entities may quickly, easily, and efficiently access those activities that are most of interest to them. Another technical effect that may be appreciated is that the unified activity service of the present disclosure improves application and/or file collaboration by providing activity metadata storage independent of the applications/files themselves and the storage platforms hosting the applications/files.

Referring now to the drawings, in which like numerals represent like elements through the several figures, aspects of the present disclosure and the exemplary operating environment will be described. With reference to FIG. 1, one aspect of a unified activity system 100 for storing activity metadata and enabling a rich collaboration experience is illustrated. In aspects, the unified activity system 100 may include a client computing device 104, a server computing device 106, an activity service 108, and a notification service 110. In a basic configuration, the client computing device 104 is a handheld computer having both input elements and output elements. The client computing device 104 may be any suitable computing device for implementing the unified activity system 100 for storing activity metadata independently of a file itself and/or a storage platform hosting the file. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device 104 for implementing the unified activity system 100 for storing activity metadata independently of a file itself and/or a storage platform hosting the file may be utilized.

In aspects, the server computing device 106 may provide data to and from the client computing device 104 and/or the activity service 108 through a network 105. In aspects, the unified activity system 100 may be implemented on more than one server computing device 106, such as a plurality of server computing devices 106. As discussed above, the server computing device 106 may provide data to and from the client computing device 104 and/or the activity service 108 through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. The data may be communicated in accordance with various communication protocols, combinations of protocols, or variations thereof. In one example, the data may be communicated in accordance with the HTTPS (Secure Hypertext Transfer Protocol).

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As discussed above, the unified activity system 100 may include a client computing device 104, a server computing device 106, an activity service 108, and a notification service 110. The various components may be implemented using hardware, software, or a combination of hardware and software. The unified activity system 100 may be configured to store activity metadata and enable a rich collaboration experience within files. In this regard, the activity service 108 may be configured to receive, store, create, generate, update, manage, and access data and/or information associated with the unified activity system 100. For example, the activity service 108 may receive, store, create, generate, update, and manage one or more activities associated with a file and/or activity metadata corresponding to the one or more activities associated with the file. In another example, the activity service 108 may provide access to the one or more activities associated with a file and/or activity metadata corresponding to the one or more activities associated with the file. In one case, the client computing device 104, the server computing device 106, and/or an application associated with the client computing device 104 and/or the server computing device 106 may access the activity service 108.

In one example, an application may include any application suitable for collaboration and/or co-authoring such as a word processing application, spreadsheet application, electronic slide presentation application, email application, chat application, voice application, and the like. In one case, a file associated with the application may include a word document, a spreadsheet, an electronic slide presentation, an email, a chat conversation, and the like. As such, an exemplary application may be an electronic slide presentation application. In this example, an exemplary file associated with the electronic slide presentation application may include an electronic slide presentation. As such, in one example, the activity service 108 may receive, store, create, generate, update, and manage one or more activities associated with the electronic slide presentation. It is appreciated that the activity service 108 may receive, store, create, generate, update, and manage one or more activities associated with any number of files associated with any number of applications.

In one example, the plurality of activities may include both client side activities and server side activities. For example, the plurality of activities may include activities associated with the client computing device 104 and activities associated with the server computing device 106. In one example, the plurality of activities may include content changes, communication activities, document content exchanges, permission requests, sharing, printing, a time associated with the activities (e.g., the time the file is printed, the time the file was shared, the time the file was edited), and the like. In aspects, the server computing device 106 is unaware of the plurality of activities associated with the client computing device 104 and the client computing device 104 is unaware of the plurality of activities associated with the server computing device 106. In one example, the plurality of activities associated with the client computing device 104 may include communications such as Instant Messaging and/or voice communications, comments, email activities, presentation of the file, a time at which the file is printed, a time at which the file is co-authored, and the like. In one case, email activities may include a time at which a file was emailed, the content of the file at the time at which the file was emailed, the sender and recipient of the email, and the like. In one example, the one or more activities associated with the server computing device 106 may include the recipient of a shared file, information associated with a renamed file, sharing a file, editing a file, renaming a file, information associated with a restored file (e.g., information regarding that the file was restored from a second version to a first version), and the like.

In aspects, the activity metadata may include at least an identifier, a timestamp, a type of activity, a location, and a link. In one case, the identifier may be an identifier of a user and/or co-author of the file. In one example, the identifier may indicate the user and/or co-author who performed an activity. In another example, the identifier may indicate a recipient of an activity. In one example, the timestamp may indicate a time at which the activity was performed. In another example, the timestamp may indicate an amount of time that has passed since an activity was performed. The type of activity may indicate the type of activity that occurred relative to the file such as any of the activities described herein. In one example, the location may indicate where the activity is located within a file and/or relative to a file. In one case, the link may provide access to the file associated with the activity. For example, if the activity is an email activity and user/co-author is in an email application, upon receiving a selection of the link, the user/co-author may access the file associated with the email activity.

In aspects, the notification service 112 may generate notifications including and/or about one or more activities that have occurred in or to a file and/or that are stored in the activity service 108. For example, a user, co-author, storage platform, and/or third party entity may receive a notification including one or more activities that have occurred in or to a file within a specific period of time (e.g., within the last week). In one example, the notification may be sent via an email application. When the notification is received, the file associated with the one or more activities included in the notification may be opened from the notification. When the file is opened from the notification, the file may include a file activity feed including the one or more activities included in the notification (e.g., the one or more activities that have occurred within the last week). The examples described herein are exemplary only and should not be considered as limiting. For example, while a specified amount of time of one week is described herein, it is appreciated that a notification may be generated for one or more activities that have occurred in any specified amount of time.

As illustrated in FIG. 1, the client computing device 104 includes a user interface component 110. In some examples, the user interface component 110 may be configured to display a file associated with an application and a file activity feed including one or more activities associated with the file, as described herein. In another example, the user interface component 110 may render a file stored on a storage platform. For example, the user interface component 110 may render any number of files stored on any number and/or type of storage platforms. In one example, the user interface component 110 may be a touchable user interface that is capable of receiving input via contact with a screen of the client computing device 104, thereby functioning as both an input device and an output device. For example, content may be displayed, or output, on the screen of the client computing device 104 and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface component 110 may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device 104, thereby functioning as both an input device and an output device. For example, content may be displayed, or output, on the screen of the client computing device 104 and input may be received by contacting the screen using a cursor, for example. In this regard, contact may include, for example, placing a cursor on the non-touchable user interface using a device such as a mouse.

In some aspects, the server computing device 106 may include a storage platform 130 and a data store 140. In one example, the storage platform 130 may be configured to store, manage, and access data and/or information associated with the unified activity system 100. For example, the storage platform 130 may store one or more files and/or one or more activities associated with a file in a data store 140. In another example, the data store 140 may include attribution information. In one case, attribution information may include information regarding the user/author performing an activity and/or a recipient of the plurality of activities. In one example, data store 140 may be part of and/or located at the storage platform 130. In another example, data store 140 may be a separate component and/or may be located separate from the storage platform 130. It is appreciated that although one server computing device 106 is illustrated in FIG. 1, the unified activity system 100 may include a plurality of server computing devices 106 with a plurality of storage platforms 130 and a plurality of data stores 140, which will be described in more detail relative to FIG. 2. In some cases, the server computing device 106 may include a plurality of storage platforms 130 and a plurality of data stores 140. For example, the plurality of storage platforms 130 may include at least file storage providers, external activity services and document editing clients. In one example, the storage platform 130 may be a cloud storage service such as OneDrive, SharePoint, Google Drive, Dropbox, and the like.

In aspects, the storage platform 130 may communicate with the client computing device 104 and/or the activity service 108. In this regard, the storage platform 130 may retrieve and/or obtain one or more activities associated with one or more files from the activity service 108. In one case, the storage platform 130 may retrieve and/or obtain activity metadata corresponding to the one or more activities from the activity service 108. In another case, the storage platform 130 may send activity metadata corresponding to one or more activities associated with one or more files to the activity service 108 for storage. In one example, a user of the client computing device 104 may create and/or access a first file. In one case, the first file is located on the client computing device 104. In another case, the first file is located on a first storage platform 130. A plurality of activities may be associated with the first file. The plurality of activities (and corresponding activity metadata) associated with the first file may be stored in the activity service 108. In one case, the client computing device 104 may obtain and/or retrieve the plurality of activities and corresponding activity metadata from the activity service 108 for display within a file activity feed of the first file on the client computing device 104. In another case, the first storage platform 130 may obtain and/or retrieve the plurality of activities and corresponding activity metadata from the activity service 108 for display within a file activity feed of the first file on the client computing device 104. In yet another case, the first storage platform 130 may obtain and/or retrieve the plurality of activities and corresponding activity metadata from the activity service 108 for providing analytics around the activity metadata and/or the plurality of activities associated with the first file.

Figure 2:
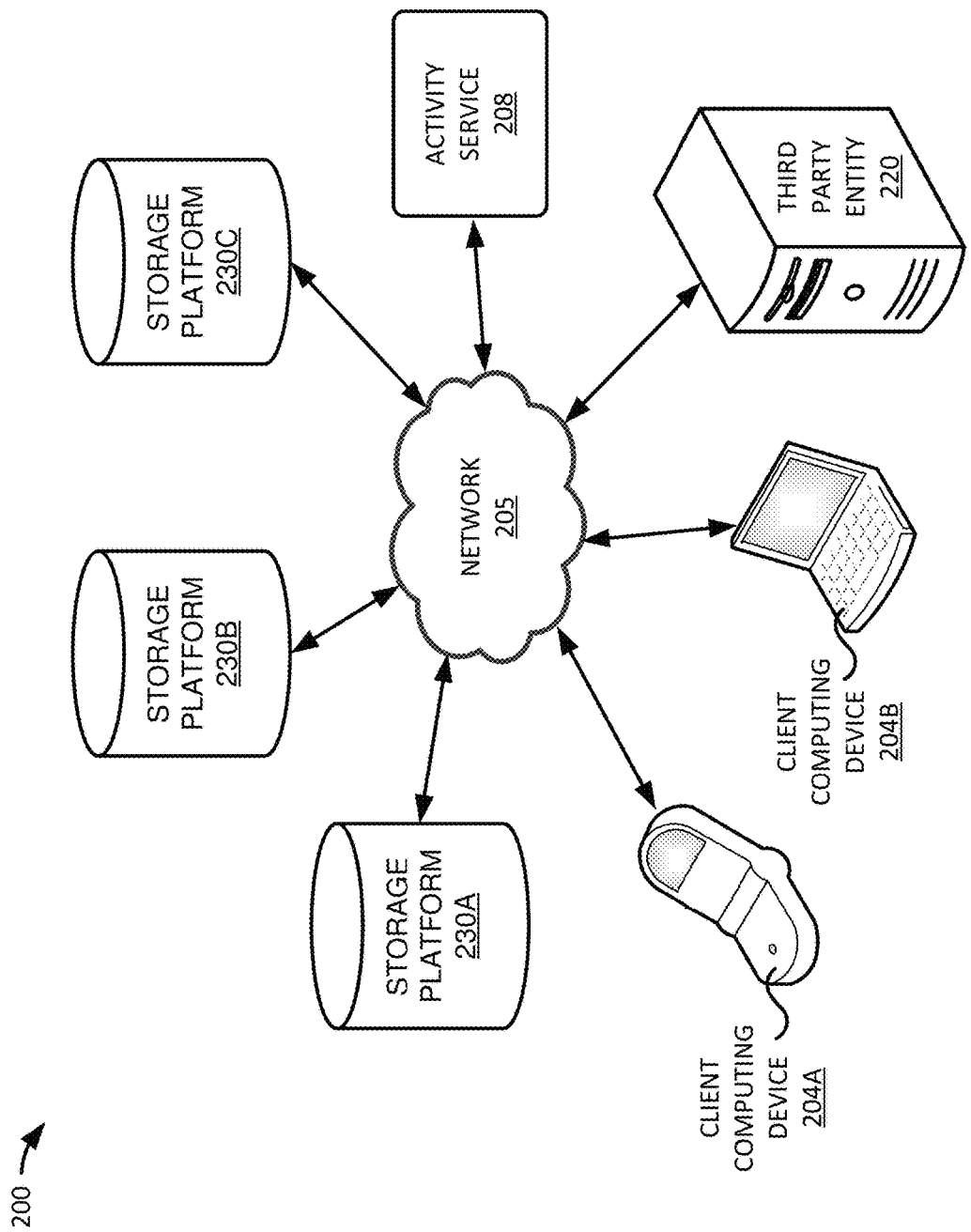
FIG. 2 illustrates an exemplary unified activity system, according to an example aspect.

Referring now to FIG. 2, one aspect of a unified activity system 200 for storing activity metadata and enabling a rich collaboration experience is illustrated. In aspects, the unified activity system 200 may include client computing devices 204A-204B, an activity service 208, a third party entity 220, and a storage platforms 230A-230C. Similar to the client computing device 104 discussed above herein relative to FIG. 1, the client computing devices 204A-204B may be a handheld computer having both input elements and output elements. The client computing devices 204A-204B may be any suitable computing device for implementing the unified activity system 200 for storing activity metadata independently of a file itself and/or a storage platform hosting the file. For example, the client computing devices 204A-204B include, but are not limited to a mobile telephone, a smart phone (e.g., 204A) a tablet, a phablet, a smart watch, a wearable computer, a personal computer, a desktop computer, a laptop computer (e.g., 204B) a gaming device/computer (e.g., Xbox), a television, and etc. This list is exemplary only and should not be considered as limiting. Any suitable the client computing devices 204A-204B for implementing the unified activity system 200 for storing activity metadata independently of a file itself and/or a storage platform hosting the file may be utilized.

In aspects, the client computing devices 204A-204B may be connected via a network 205. In this regard, the client computing devices 204A-204B may provide data to and from the activity service 208, the third party entity 220, and/or the storage platforms 230A-230C through the network 105. The third party entity 220 may provide data to and from the activity service 208, the client computing devices 204A-204B, and/or the storage platforms 230A-230C through the network 105. The storage platforms 230A-230C may provide data to and from the client computing devices 204A-204B, the activity service 208, and/or the third party entity 220 through the network 205. The activity service 208 may provide data to and from the client computing devices 204A-204B, the storage platforms 230A-230C, and/or the third party entity 220 through the network 205. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. The data may be communicated in accordance with various communication protocols, combinations of protocols, or variations thereof. In one example, the data may be communicated in accordance with the HTTPS (Secure Hypertext Transfer Protocol).

In one aspect, similar to the unified activity system 100 of FIG. 1, the unified activity system 200 may include an activity service 208 and storage platforms 230A-230C. In this regard, the activity service 208 and storage platforms 230A-230C may have the same functionality and/or features as the activity service 108 and storage platform 130 described herein relative to FIG. 1. The third party entity 220 may include any entity capable of providing a cloud connected storage platform agnostic file authoring, collaboration solution. For example, the third party entity 220 may include entities such as social media, academics and/or universities, file/document processing tools, content reading and/or converting software, any service and/or component that generates interesting information around a file, and the like. It is appreciated that while the unified activity system 200 illustrates the third party entity 220, any number of third party entities may be implemented within the unified activity system 200.

In one aspect, an indication of an occurrence of at least one activity associated with a file (e.g., a first file) may be received. For example, an author may open a file on the client computing device 204A. In one case, the file may be a word document associated with a word processing application. In one example, the word processing application is a Microsoft Office word processing application. The author may make an edit to the file and/or print the file, for example. In this regard, an indication of the occurrence of the edit and/or printing may be received at the client computing device 204A. The client computing device 204A may generate activity metadata corresponding to the edit and/or printing activities. For example, the generated activity metadata may include data such as an author identifier indicating who edited and/or printed the file, a time at which the file was edited and/or printed, the type of activity (e.g., editing and/or printing), and the like. The client computing device 204A may send the generated activity metadata to the activity service 208 via the network 205 for storing the generated activity metadata. In this regard, the activity service 208 may receive the activity metadata corresponding to the editing and/or printing activities associated with the file and store the activity metadata. In one example, the file associated with the editing and printing activities may include a global identifier. In one case, the global identifier identifies the file and the device where the file is stored. For example, in this case, the global identifier may identify the file and that the file is stored on the client computing device 204A. As such, the global identifier may be sent to the activity service 208 with the generated activity metadata for storing. In the described example, the file (and the file contents) is stored at the client computing device 204A and the activity metadata associated with the file is stored at the storage service 208. In this regard, the file is stored independently of the activity service 108.

In one example, the file opened on the client computing device 204A may be stored on the storage platform 230A. In one example, the storage platform 230A may be a storage platform such as OneDrive. In this regard, an indication of the occurrence of the edit and/or printing may be received at the storage platform 230A. The storage platform 230A may generate activity metadata corresponding to the edit and/or printing activities. For example, the generated activity metadata may include data such as an author identifier indicating who edited and/or printed the file, a time at which the file was edited and/or printed, the type of activity (e.g., editing and/or printing), and the like. The storage platform 230A may send the generated activity metadata to the activity service 208 via the network 205 for storing the generated activity metadata. In this case, the global identifier may identify the file and that the file is stored on the storage platform 230A. As such, the global identifier may be sent to the activity service 208 with the generated activity metadata for storing. In the described example, the file (and the file contents) is stored at storage platform 230A and the activity metadata associated with the file is stored at the storage service 208. In this regard, the storage platform 230A is independent of the activity service 208.

In another aspect, the file stored on the storage platform 230A may be rendered on a user interface of the client computing device 204B. The client computing device 204B may obtain one or more activities including corresponding activity metadata associated with the file from the activity service 208. For example, the client computing device 204B may obtain the edit and/or printing activities including corresponding activity metadata that occurred to the file (e.g., as described above herein). In this regard, a co-author of the file (e.g., a user of the client computing device 204B) may be informed of the activities that have occurred to the file by another co-author. In one example, the activities (e.g., the edit and/or printing activities) and corresponding activity metadata may be displayed within a file activity feed of the file. In one case, the client computing device 204B may obtain the one or more activities and corresponding activity metadata by sending a request to the activity service 208 for the one or more activities and corresponding activity metadata. In some cases, it is determined whether the author/user associated with the file has permission to access the one or more activities and corresponding activity metadata before the client computing device 204B can obtain the one or more activities and corresponding activity metadata. In one implementation, the client computing devices 204A-204B may receive a request from the activity service 208 to determine whether the author/user associated with the file has permission to access the one or more activities and corresponding activity metadata. In another implementation, the storage platforms 230A-230C may receive a request from the activity service 208 to determine whether the author/user associated with the file has permission to access the one or more activities and corresponding activity metadata.

In one aspect, an indication of an occurrence of at least one activity associated with another file (e.g., a second file) may be received. For example, an author may open another file on the client computing device 204A. In one case, the file may be a spreadsheet associated with a spreadsheet application. In one example, the spreadsheet application is a Microsoft Office spreadsheet application such as Excel. The author may make a comment on the file and/or rename the file, for example. In this regard, an indication of the occurrence of the comment and/or renaming of the second file may be received at the client computing device 204A. The client computing device 204A may generate activity metadata corresponding to the comment and/or renaming of the second file activities. For example, the generated activity metadata may include data such as an author identifier indicating who commented and/or renamed the second file, a time at which the second file was renamed and/or a time at which the comment was made, the type of activity (e.g., commenting and/or renaming), and the like. The client computing device 204A may send the generated activity metadata to the activity service 208 via the network 205 for storing the generated activity metadata. In this regard, the activity service 208 may receive the activity metadata corresponding to the commenting and/or renaming activities associated with the second file and store the activity metadata. In one example, the second file associated with the commenting and renaming activities may include a global identifier. In one case, the global identifier identifies the second file and the device where the second file is stored. For example, in this case, the global identifier may identify the second file and that the second file is stored on the client computing device 204A. As such, the global identifier may be sent to the activity service 208 with the generated activity metadata for storing. In the described example, the second file (and the second file contents) is stored at the client computing device 204A and the activity metadata associated with the second file is stored at the storage service 208. In this regard, the second file is stored independently of the activity service 108.

In one example, the second file opened on the client computing device 204A may be stored on the storage platform 230B. In one example, the storage platform 230B may be a storage platform such as Dropbox. In this regard, an indication of the occurrence of the comment and/or renaming the second file may be received at the storage platform 230B. The storage platform 230B may generate activity metadata corresponding to the comment and/or renaming activities. For example, the generated activity metadata may include data such as an author identifier indicating who commented on and/or renamed the second file, a time at which the second file was renamed and/or a time at which a comment was made, the type of activity (e.g., comment and/or renaming the second file), and the like. The storage platform 230B may send the generated activity metadata to the activity service 208 via the network 205 for storing the generated activity metadata. In this case, the global identifier may identify the second file and that the second file is stored on the storage platform 230B. As such, the global identifier may be sent to the activity service 208 with the generated activity metadata for storing. In the described example, the second file (and the second file contents) is stored at storage platform 230B and the activity metadata associated with the second file is stored at the storage service 208. In this regard, the storage platform 230B is independent of the activity service 208.

In another aspect, the second file stored on the storage platform 230B may be rendered on a user interface of the client computing device 204B. The client computing device 204B may obtain one or more activities associated with the second file from the activity service 208. The one or more activities may include corresponding activity metadata. For example, the client computing device 204B may obtain the comment and/or renaming activities including corresponding activity metadata that occurred to the second file (e.g., as described above herein). In this regard, a co-author of the second file (e.g., a user of the client computing device 204B) may be informed of the activities that have occurred to the second file by another co-author. In one example, the activities (e.g., the comment and/or renaming activities) and corresponding metadata may be displayed within a file activity feed of the second file. In one case, the client computing device 204B may obtain the one or more activities and corresponding activity metadata by sending a request to the activity service 208 for the one or more activities and corresponding activity metadata. In some cases, it is determined whether the author/user associated with the second file has permission to access the one or more activities and corresponding activity metadata before the client computing device 204B can obtain the one or more activities and corresponding activity metadata.

In one aspect, an indication of an occurrence of at least one activity associated with another file (e.g., a third file) may be received. For example, an author may open a third file on the client computing device 204A. In one case, the third file may be an electronic slide presentation associated with an electronic slide presentation application. In one example, the electronic slide presentation application is a Microsoft Office electronic slide presentation application such as PowerPoint. The author may present the third file and/or mention the third file in an email, for example. In this regard, an indication of the occurrence of the presentation and/or email may be received at the client computing device 204A. The client computing device 204A may generate activity metadata corresponding to the presentation and/or email activities. For example, the generated activity metadata may include data such as an author identifier indicating who presented and/or mentioned the third file in an email, a time at which the third file was presented and/or mentioned in the email, the type of activity (e.g., presenting and/or emailing), and the like. The client computing device 204A may send the generated activity metadata to the activity service 208 via the network 205 for storing the generated activity metadata. In this regard, the activity service 208 may receive the activity metadata corresponding to the presentation and/or email activities associated with the third file and store the activity metadata. In one example, the third file associated with the presentation and email activities may include a global identifier. In one case, the global identifier identifies the third file and the device where the third file is stored. For example, in this case, the global identifier may identify the third file and that the third file is stored on the client computing device 204A. As such, the global identifier may be sent to the activity service 208 with the generated activity metadata for storing. In the described example, the third file (and the third file contents) is stored at the client computing device 204A and the activity metadata associated with the third file is stored at the storage service 208. In this regard, the third file is stored independently of the activity service 108.

In one example, the third file opened on the client computing device 204A may be stored on the storage platform 230C. In one example, the storage platform 230C may be a storage platform such as SharePoint. In this regard, an indication of the occurrence of the presentation and/or email may be received at the storage platform 230C. The storage platform 230C may generate activity metadata corresponding to the presentation and/or email activities. For example, the generated activity metadata may include data such as an author identifier indicating who presented and/or emailed the third file, a time at which the third file was presented and/or emailed, the type of activity (e.g., presentation and/or email), and the like. The storage platform 230C may send the generated activity metadata to the activity service 208 via the network 205 for storing the generated activity metadata. In this case, the global identifier may identify the third file and that the third file is stored on the storage platform 230C. As such, the global identifier may be sent to the activity service 208 with the generated activity metadata for storing. In the described example, the third file (and the third file contents) is stored at storage platform 230C and the activity metadata associated with the third file is stored at the storage service 208. In this regard, the storage platform 230C is independent of the activity service 208.

In another aspect, the third file stored on the storage platform 230C may be rendered on a user interface of the client computing device 204B. The client computing device 204B may obtain one or more activities associated with the third file from the activity service 208. The one or more activities may include corresponding activity metadata. For example, the client computing device 204B may obtain the presentation and/or email activities and corresponding activity metadata that occurred to the third file (e.g., as described above herein). In this regard, a co-author of the third file (e.g., a user of the client computing device 204B) may be informed of the activities that have occurred to the third file by another co-author. In one example, the activities (e.g., the presentation and/or email activities) and corresponding metadata may be displayed within a file activity feed of the third file. In one case, the client computing device 204B may obtain the one or more activities and corresponding activity metadata by sending a request to the activity service 208 for the one or more activities and corresponding activity metadata. In some cases, it is determined whether the author/user associated with the third file has permission to access the one or more activities and corresponding activity metadata before the client computing device 204B can obtain the one or more activities and corresponding activity metadata.

In some aspects, the storage platforms 230A-230C may perform and/or provide analytics on the one or more activities and/or corresponding activity metadata associated with a file and/or a plurality of files. As discussed above, the storage platforms 230A-230C may generate activity metadata corresponding to one or more activities associated with a file. The storage platforms 230A-230C may send the generated activity metadata to the activity service 208 via the network 205 for storing the generated activity metadata. In another example, the storage platforms 230A-230C may obtain and/or retrieve activity metadata corresponding to one or more activities associated with a file. In this regard, the storage platforms 230A-230C may perform analytics on the activity metadata. In one case, the storage platforms 230A-230C may create hot files by performing analytics on the activity metadata and/or one or more activities. Hot files may include those files where many changes and/or activities have occurred relative to the file within a specified amount of time. The specified amount of time may include any amount of time (e.g., within one day, one week, one month). In another case, hot files may include those files where many changes and/or activities have occurred relative to the file that are of a particular interest to a user and/or co-author. For example, one user and/or co-author may be interested in changes by another particular co-author. In this example, when a number of changes have occurred to a file by the particular co-author, the author interested in the changes by the particular co-author may receive an indication of such changes by receiving a notification. In one example, when the user receives the notification, the user may open the file and see the changes that have occurred by the particular co-author (e.g., the changes may be displayed in the file content pane and the corresponding metadata may be displayed within a file activity feed of the file). It is appreciated that any type of analytics may be performed on the activity metadata and/or one or more activities associated with a file and may be provided to any user, co-author and/or entity for consumption.

In one aspect, the activity service 208 may generate activity metadata corresponding to a plurality of activities associated with a file stored on any of the storage platforms 230A-230C. For example, the activity service 208 may generate activity metadata corresponding to a plurality of activities associated with a file stored on storage platforms 230A (e.g., a first storage platform). In another example, the activity service 208 may generate activity metadata corresponding to a plurality of activities associated with a file stored on the storage platform 230B (e.g., a second storage platform). In yet another example, the activity service 208 may generate activity metadata corresponding to a plurality of activities associated with a file stored on the storage platform 230C (e.g., a third storage platform). In another aspect, the activity service 208 may send the generated activity metadata to any of the storage platforms 230A-230B. For example, the activity service 208 may send the generated activity metadata to the storage platform 230A (e.g., a first storage platform). In another example, the activity service 208 may send the generated activity metadata to the storage platform 230B (e.g., a second storage platform). In yet another example, the activity service 208 may send the generated activity metadata to the storage platform 230C (e.g., a third storage platform).

In some aspects, the activity service 208 may receive a request from the third party entity 220 for activity metadata corresponding to a plurality of activities associated with a file stored on a first storage platform (e.g., any of storage platforms 230A-230C). The activity service 208 may send the requested activity metadata to the third party entity 220. In one case, the third party entity 220 is independent of the activity service 208. In another case, the third party entity 220 is independent of the storage platforms 230A-230C. In some cases, the third party entity 220 may generate activity metadata corresponding to a plurality of activities associated with a file. The third party entity 220 may send the generated activity metadata to the activity service 208 for storing. In some examples, the storage platforms 230A-230C may send a request to the activity service 208 for the activities and corresponding activity metadata generated by the third party entity 220. In other examples, the third party entity 220 may include a storage platform (not illustrated) associated with the third party entity 220. The storage platform associated with the third party entity 220 may send a request to the activity service 208 for the activities and corresponding activity metadata generated by the third party entity 220. In one example, the third party entity 220 may be a University. In this example, the one or more activities associated with a file that may be generated may include activities such as those that indicate when a paper has been completed by a student and when a paper has been graded by a professor. It is appreciated that while examples of third party entities, storage platforms, files, application, and activities are described herein, the discussion of third party entities, storage platforms, files, applications, and activities is exemplary only and should not be considered as limiting.

It is appreciated that while FIG. 2 illustrates client computing devices 204A-204B, activity service 208, third party entity 220, and storage platforms 230A-230C of the unified activity system 200, the discussion of client computing devices 204A-204B, activity service 208, third party entity 220, and storage platforms 230A-230C and the unified activity system 200 is exemplary only and should not be considered as limiting. Any suitable number and/or type of client computing devices, storage platforms, and third party entities may generate activity metadata corresponding to one or more activities associated with any number of files and communicate with the activity service 208 (e.g., send to, write to, read from, receive from, consume) such that activities (and corresponding activity metadata) associated with files may be stored and/or consumed independently of the file associated with the activities, the content of the file associated with the activities, and/or the storage platforms hosting the files associated with the activities. Furthermore, while the present disclosure discusses the word processing application, the spreadsheet application, and the electronic slide application, the first file, the second file, the third file, the first storage platform, the second storage platform, the third storage platform, the first client computing device, the second client computing device, and the third party entity, this is only exemplary and should not be considered limiting. Any number of applications, files, storage platforms, client computing devices, and/or third party entities may be utilized in conjunction with the present disclosure.

Figure 3:
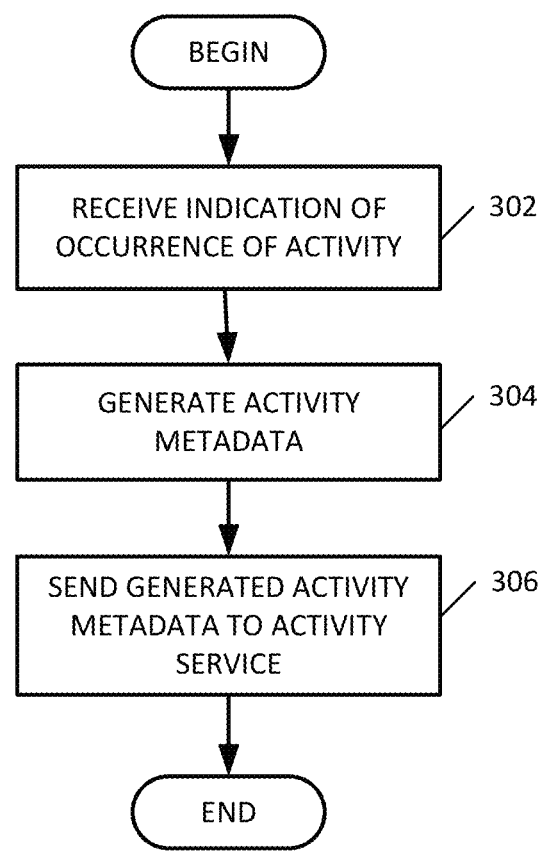
FIG. 3 illustrates an exemplary method for storing activity metadata in an activity service, according to an example aspect.

Referring now to FIG. 3, an exemplary method 300 for storing activity metadata in an activity service, according to an example aspect is shown. Method 300 may be implemented on a computing device or a similar electronic device capable of executing instructions through at least one processor. One or more activities and corresponding activity metadata may be generated by any suitable software application. For example, the software application may be one of an email application, a social networking application, project management application, a collaboration application, an enterprise management application, a messaging application, a word processing application, a spreadsheet application, a database application, a presentation application, a contacts application, a calendaring application, and etc. This list is exemplary only and should not be considered as limiting. Any suitable application for generating and storing activity metadata may be utilized by method 300.

Method 300 may begin at operation 302, where an indication of an occurrence of at least one activity associated with a file stored independently of an activity service may be received. For example, an author may open a file on a client computing device. In one case, the file may be stored on the client computing device. In this regard, the indication of the occurrence of the at least one activity may be received at the client computing device. In another case, the file may be stored on a storage platform. In this regard, the indication of the occurrence of the at least one activity may be received at the storage platform.

When an indication of an occurrence of at least one activity associated with a file stored independently of an activity service is received, flow proceeds to operation 304 where activity metadata corresponding to the at least one activity associated with the file is generated. In one example, the activity metadata is generated at a client computing device. In another example, the activity metadata is generated at a storage platform. In one example, the activity metadata may include at least an identifier, a timestamp, a type of activity, a location, and a link. In one case, the identifier may be an identifier of a user and/or co-author of the file. In one example, the identifier may indicate the user and/or co-author who performed an activity. In another example, the identifier may indicate a recipient of an activity. In one example, the timestamp may indicate a time at which the activity was performed. In another example, the timestamp may indicate an amount of time that has passed since an activity was performed. The type of activity may indicate the type of activity that occurred relative to the file such as any of the activities described herein. In one example, the location may indicate where the activity is located within a file and/or relative to a file. In one case, the link may provide access to the file associated with the activity. For example, if the activity is an email activity and user/co-author is in an email application, upon receiving a selection of the link, the user/co-author may access the file associated with the email activity.

When activity metadata corresponding to the at least one activity associated with the file is generated, flow proceeds to operation 306 where the generated activity metadata is sent to the activity service for storing the generated activity metadata. In one case, generated activity metadata may be sent from a client computing device. In another case, the generated activity metadata may be sent from a storage platform. In yet another case, the generated activity metadata may be sent from a third party entity. In one example, one or more activities including the corresponding generated activity metadata may be sent from at least one of a client computing device, a storage platform, and a third party entity.

Figure 4:
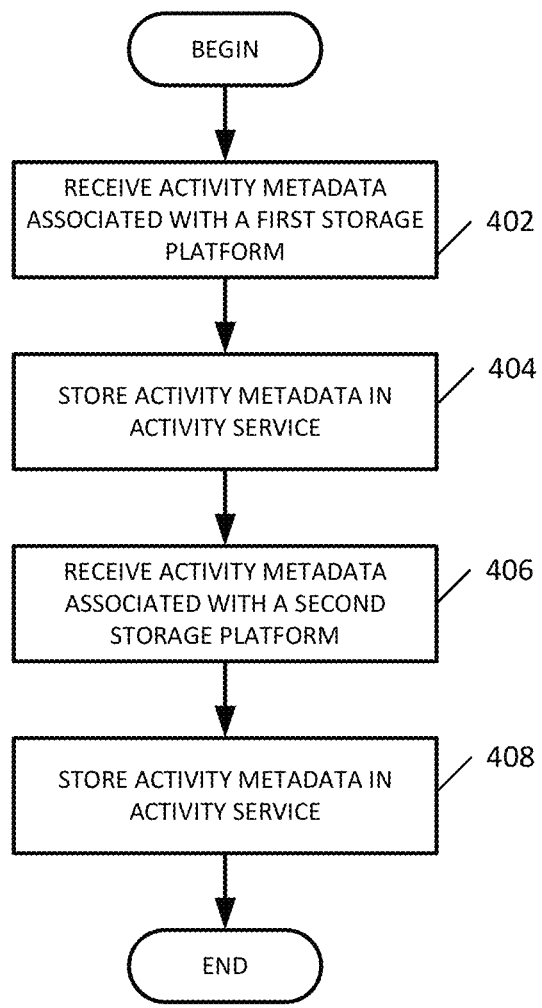
FIG. 4 illustrates an exemplary method for storing activity metadata in an activity service, according to an example aspect.

Referring now to FIG. 4, an exemplary method 400 for storing activity metadata in an activity service, according to an example aspect is shown. Method 400 may be implemented on a computing device or a similar electronic device capable of executing instructions through at least one processor. Method 400 begins at operation 402 where activity metadata corresponding to at least one activity associated with a file stored on a first storage platform is received at the activity service. In one example, the first storage platform is independent of the activity service. In another example, the file stored on the first storage platform is independent of the activity service. In this regard, the file (and the contents of the file) is stored independently of the at least one activity and corresponding activity metadata associated with the file.

When activity metadata corresponding to at least one activity associated with a file stored on a first storage platform is received at the activity service, flow proceeds to operation 404 where the activity metadata corresponding to the at least one activity associated with the file stored on the first storage platform is stored. In one example, the activity service may store activity metadata from a client computing device. In another case, the activity service may store activity metadata from a storage platform. In another case, the activity service may store activity metadata from a third party entity. In one example, the activity service may store one or more activities from at least one of a client computing device, a storage platform, and a third party entity. The activity service may store activity metadata corresponding to a plurality of activities associated with a plurality of files stored on a plurality of storage platforms.

At operation 406 activity metadata corresponding to at least one activity associated with another file stored on a second storage platform is received at the activity service. In one example, the second storage platform is independent of the activity service. In another example, the another file stored on the second storage platform is independent of the activity service. In this regard, the another file (and the contents of the another file) is stored independently of the at least one activity and corresponding activity metadata associated with the another file.

When activity metadata corresponding to at least one activity associated with another file stored on a second storage platform is received at the activity service, flow proceeds to operation 408 where the activity metadata corresponding to the at least one activity associated with the another file stored on the second storage platform is stored. In one example, the activity service may store activity metadata from a client computing device. In another case, the activity service may store activity metadata from a storage platform. In another case, the activity service may store activity metadata from a third party entity. In one example, the activity service may store one or more activities from at least one of a client computing device, a storage platform, and a third party entity. The activity service may store activity metadata corresponding to a plurality of activities associated with a plurality of files stored on a plurality of storage platforms.

Figure 5:
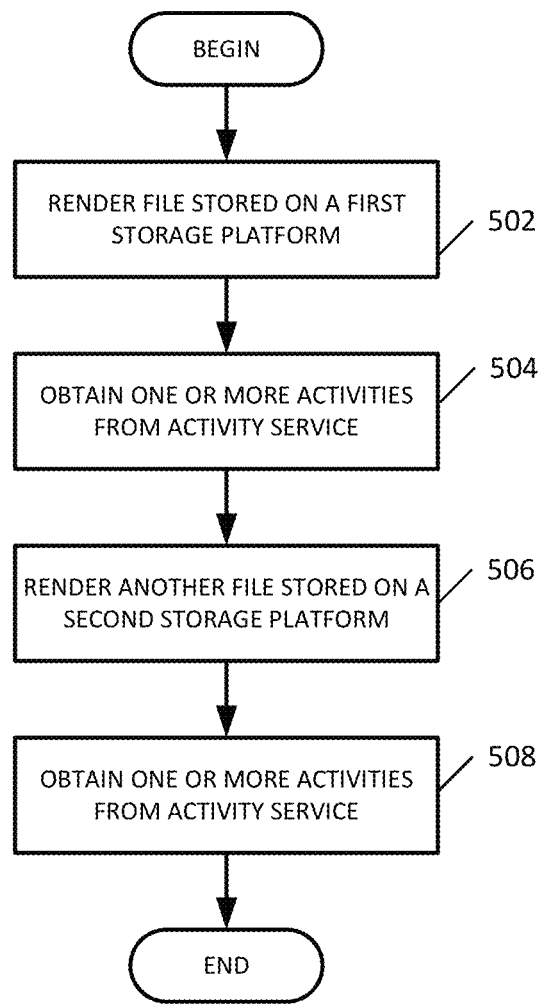
FIG. 5 illustrates an exemplary method for accessing one or more activities from an activity service, according to an example aspect.

Referring now to FIG. 5, an exemplary method 500 for accessing one or more activities from an activity service, according to an example aspect is shown. Method 500 may be implemented on a computing device or a similar electronic device capable of executing instructions through at least one processor. Method 500 begins at operation 502 where a file stored on a first storage platform is rendered on a first user interface. In one example, the file may be rendered on a first user interface of a client computing device. The file stored on the first storage platform may be rendered on a plurality of user interfaces of a plurality of client computing devices. For example, the file may be rendered on a second user interface of a second client computing device. In another example, the file may be rendered on a third user interface of a third client computing device. The file stored on the first storage platform may be rendered on any number of client computing devices.

When the file stored on the first storage platform is rendered on the first user interface, flow proceeds to operation 504 where one or more activities associated with the file are obtained from the activity service. In one case, the one or more activities include corresponding activity metadata. For example, the client computing device may obtain the one or more activities including corresponding activity metadata that occurred to the file. In this regard, a co-author of the file (e.g., a user of the client computing device) may be informed of the activities that have occurred to the file by another co-author. In one example, the one or more activities and corresponding activity metadata may be displayed within a file activity feed of the file. In one case, the client computing device may obtain the one or more activities and corresponding activity metadata by sending a request to the activity service for the one or more activities and corresponding activity metadata.

At operation 506 another file stored on a second storage platform is rendered on a second user interface. In one example, the another (e.g., second) file may be rendered on a second user interface of a client computing device. The second file stored on the second storage platform may be rendered on a plurality of user interfaces of a plurality of client computing devices. For example, the second file may be rendered on a second user interface of a second client computing device. In another example, the second file may be rendered on a third user interface of a third client computing device. The second file stored on the second storage platform may be rendered on any number of client computing devices.

When the another (e.g., second) file stored on the second storage platform is rendered on the second user interface, flow proceeds to operation 508 where one or more activities associated with the another file are obtained from the activity service. In one case, the one or more activities include corresponding activity metadata. For example, a client computing device may obtain the one or more activities including corresponding activity metadata that occurred to the second file. In this regard, a co-author of the second file (e.g., a user of the client computing device) may be informed of the activities that have occurred to the second file by another co-author. In one example, the one or more activities and corresponding activity metadata may be displayed within a file activity feed of the second file. In one case, the client computing device may obtain the one or more activities and corresponding activity metadata by sending a request to the activity service for the one or more activities and corresponding activity metadata.

The term rendering as used herein generally refers to the various capabilities employed in various computing architectures to assemble information that can then be used by other capabilities to generate an image or images. Within the context of method 500, for example, rendering a file on user interface, for example, generally refers to assembling the information or data used to generate an image or images that together result in the file. Animation or other dynamics may also be used to achieve certain effects.

However, it may be appreciated that other perspectives on rendering may be considered within the scope of the present disclosure. For example, rendering as used herein may also, in some scenarios, be considered to refer to the various capabilities employed by various computing architectures to generate an image or images from information assembled for that purpose. With respect to the method 500, rendering a file on a user interface may refer to generating an image or images, from information assembled for that purpose, that together result in the file, which can then be displayed.

It may also be appreciated that rendering in some scenarios may refer to a combination of the aforementioned possibilities. For example, rendering in some scenarios may refer to both assembling the information used to generate an image or images for a file and then generating the image or images of the file. In addition, a wide variety of other steps, processes, and stages may occur within the context of presenting a file, all of which may be considered part of presenting a file. Thus, yet one other variation on method 500 includes, but is not limited to, presenting a file on a first user interface, obtaining one or more activities, presenting another file on a second user interface, and obtaining one or more activities.

Figure 6:
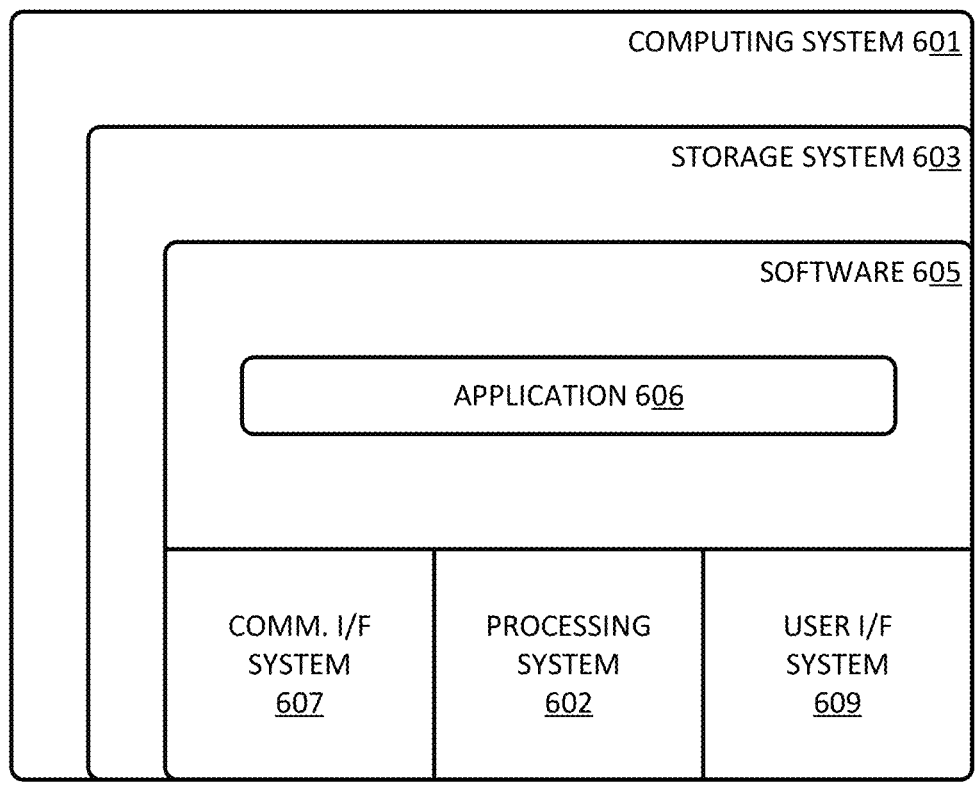
FIG. 6 illustrates a computing system suitable for implementing the enhanced unified activity service technology disclosed herein, including any of the environments, architectures, elements, processes, user interfaces, and operational scenarios and sequences illustrated in the Figures and discussed below in the Technical Disclosure.

FIG. 6 illustrates computing system 601 that is representative of any system or collection of systems in which the various applications, services, scenarios, and processes disclosed herein may be implemented. Examples of computing system 601 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 609. Processing system 602 is operatively coupled with storage system 603, communication interface system 607, and user interface system 609.

Processing system 602 loads and executes software 605 from storage system 603. Software 605 includes application 606, which is representative of the applications discussed with respect to the preceding FIGS. 1-5, including electronic slide applications and word processing applications described herein. When executed by processing system 602 to enhance unified activity services, software 605 directs processing system 602 to operate as described herein for at least the various processes, operational scenarios, and sequences discussed in the foregoing implementations. Computing system 601 may optionally include additional devices, features, or functionality not discussed for purposes of brevity.

Referring still to FIG. 6, processing system 602 may comprise a micro-processor and other circuitry that retrieves and executes software 605 from storage system 603. Processing system 602 may be implemented within a single processing device, but may also be distributed across multiple processing devices or sub-systems that cooperate in executing program instructions. Examples of processing system 602 include general purpose central processing units, application specific processors, and logic devices, as well as any other type of processing device, combinations, or variations thereof.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device, but may also be implemented across multiple storage devices or sub-systems co-located or distributed relative to each other. Storage system 603 may comprise additional elements, such as a controller, capable of communicating with processing system 602 or possibly other systems.

Software 605 may be implemented in program instructions and among other functions may, when executed by processing system 602, direct processing system 602 to operate as described with respect to the various operational scenarios, sequences, and processes illustrated herein. For example, software 605 may include program instructions for implementing enhanced unified activity services.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtual machine software, or other application software, in addition to or that include application 606. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to facilitate enhanced unified activity services. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 609 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 609. In some cases, the input and output devices may be combined in a single device, such as a display capable of displaying images and receiving touch gestures. The aforementioned user input and output devices are well known in the art and need not be discussed at length here.

User interface system 609 may also include associated user interface software executable by processing system 602 in support of the various user input and output devices discussed above. Separately or in conjunction with each other and other hardware and software elements, the user interface software and user interface devices may support a graphical user interface, a natural user interface, or any other type of user interface.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising: one or more computer readable storage media; and program instructions stored on the one or more computer readable storage media that, when executed by at least one processor, cause the at least one processor to at least: render, on a first user interface, a file stored on a first storage platform; obtain one or more activities associated with the file from the activity service, wherein the one or more activities include corresponding activity metadata; render, on a second user interface, another file stored on a second storage platform; and obtain one or more activities associated with the another file from the activity service, wherein the one or more activities include corresponding activity metadata. In further examples, the first user interface and the second user interface are the same, and wherein the file is rendered on a client computing device, and wherein the another file is rendered on the client computing device. In further examples, the file is rendered on a first client computing device, and wherein the another file is rendered on a second client computing device. In further examples, the first storage platform is independent of the activity service. In further examples, the second storage platform is independent of the activity service. In further examples, the program instructions further cause the at least one processor to at least determine whether a user associated with the file has permission to access the one or more activities before obtaining the one or more activities associated with the file from the activity service. In further examples, the program instructions further cause the at least one processor to at least determine whether a user associated with the another file has permission to access the one or more activities before obtaining the one or more activities associated with the another file from the activity service. In further examples, the activity metadata includes at least one of an identifier, a timestamp, a type, a location, and a link.

Further aspects disclosed herein provide an exemplary method for storing activity metadata in an activity service, the method comprising: receiving an indication of an occurrence of at least one activity associated with a file stored independently of the activity service; generating activity metadata corresponding to the at least one activity associated with the file; and sending the generated activity metadata to the activity service for storing the generated activity metadata. In further examples, the file is stored on a client computing device. In further examples, the file is stored on a first storage platform. In further examples, the method further comprises: receiving an indication of an occurrence of at least one activity associated with another file stored on a second storage platform; generating activity metadata corresponding to the at least one activity associated with the another file; and sending the generated activity metadata to the activity service for storing the generated activity metadata. In further examples, the second storage platform is independent of the activity service.

Additional aspects disclosed herein provide exemplary systems comprising: at least one processor; and memory encoding computer executable instructions that, when executed by the at least one processor, perform a method for storing activity metadata in an activity service, the method comprising: receiving, at the activity service, activity metadata corresponding to at least one activity associated with a file stored on a first storage platform; storing the activity metadata corresponding to the at least one activity associated with the file stored on the first storage platform; receiving, at the activity service, activity metadata corresponding to at least one activity associated with another file stored on a second storage platform; and storing the activity metadata corresponding to the at least one activity associated with the another file stored on the second storage platform. In further examples, the system further comprises: generating activity metadata corresponding to a plurality of activities associated with the file stored on the first storage platform; and sending the generated activity metadata to the first storage platform. In further examples, the system further comprises generating activity metadata corresponding to a plurality of activities associated with the another file stored on the second storage platform; and sending the generated activity metadata to the second storage platform. In further examples, receiving, from a third party entity, a request for activity metadata corresponding to a plurality of activities associated with the file stored on the first storage platform; and sending the requested activity metadata to the third party entity, wherein the third party entity is independent of the activity service, the first storage platform, and the second storage platform. In further examples, the file stored on the first storage platform has a first global identifier, and wherein the another file stored on the second storage platform has a second global identifier. In further examples, the activity service stores activity metadata corresponding to a plurality of activities associated with a plurality of files stored on a plurality of storage platforms. In further examples, the system further comprises: receiving, at the activity service, activity metadata corresponding to at least one activity associated with another file stored on a third storage platform; and storing the activity metadata corresponding to the at least one activity associated with the another file stored on the third storage platform.

Techniques for generating and storing activity metadata are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of unified activity services that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
one or more computer readable storage media; and
program instructions stored on the one or more computer readable storage media that, when executed by at least one processor, cause the at least one processor to at least:
render, on a first user interface, a file stored on a first cloud storage provider;
obtain one or more activities associated with the file from an activity service, wherein the one or more activities include corresponding activity metadata, and wherein the file is stored on the first cloud storage provider and the one or more activities and the corresponding activity metadata are stored at the activity service, and wherein the first cloud storage provider is independent of the activity service;
display the one or more activities and the corresponding activity metadata associated with the file within a file activity feed of the file;
render, on a second user interface, another file stored on a second cloud storage provider;
obtain one or more activities associated with the another file from the activity service, wherein the one or more activities include corresponding activity metadata, and wherein the another file is stored on the second cloud storage provider and the one or more activities and the corresponding activity metadata are stored at the activity service, and wherein the second cloud storage provider is independent of the activity service and a different cloud storage provider than the first cloud storage provider;
display the one or more activities and the corresponding activity metadata associated with the another file within a file activity feed of the another file;
receive an indication of an occurrence of at least one activity associated with the another file stored on the second cloud storage provider;
generate activity metadata corresponding to the at least one activity associated with the another file; and
send the generated activity metadata to the activity service for storing the generated activity metadata.

2. The system of claim 1, wherein the first user interface and the second user interface are the same, and wherein the file is rendered on a client computing device, and wherein the another file is rendered on the client computing device.

3. The system of claim 1, wherein the file is rendered on a first client computing device, and wherein the another file is rendered on a second client computing device.

4. The system of claim 1, wherein the program instructions further cause the at least one processor to at least determine whether a user associated with the file has permission to access the one or more activities before obtaining the one or more activities associated with the file from the activity service.

5. The system of claim 1, wherein the program instructions further cause the at least one processor to at least determine whether a user associated with the another file has permission to access the one or more activities before obtaining the one or more activities associated with the another file from the activity service.

6. The system of claim 1, wherein the activity metadata includes at least one of an identifier, a timestamp, a type, a location, and a link.

7. The system of claim 1, wherein the program instructions further cause the at least one processor to at least:
receive an indication of an occurrence of at least one activity associated with the file stored on the first cloud storage provider;
generate activity metadata corresponding to the at least one activity associated with the file; and
send the generated activity metadata to the activity service for storing the generated activity metadata.

8. The system of claim 1, wherein the program instructions further cause the at least one processor to at least:
render, on a third user interface, another file stored on a third cloud storage provider; and
obtain one or more activities associated with the another file from the activity service, wherein the one or more activities include corresponding activity metadata, and wherein the another file is stored on the third cloud storage provider and the one or more activities and the corresponding activity metadata are stored at the activity service, and wherein the third cloud storage provider is independent of the activity service and a different cloud storage provider than the first cloud storage provider and the second cloud storage provider.

9. A computer-implemented method for storing activity metadata in an activity service, the method comprising:
receiving an indication of an occurrence of at least one activity associated with a first file stored independently of the activity service, where the activity service is configured for storing the at least one activity and the activity metadata associated with the first file, and where the activity service is independent of a client computing device and a first cloud storage provider for hosting the first file;
generating activity metadata corresponding to the at least one activity associated with the first file;
sending the generated activity metadata to the activity service for storing the generated activity metadata;
obtain, from the activity service, at least one activity and corresponding activity metadata associated with the first file for display within a file activity feed of the first file;
receiving an indication of an occurrence of at least one activity associated with a second file stored independently of the activity service and the first file, where the activity service is configured for storing the at least one activity and the activity metadata associated with the second file, and where the activity service is independent of a second cloud storage provider for hosting the second file;
generating activity metadata corresponding to the at least one activity associated with the another file; and
sending the generated activity metadata corresponding to the at least one activity associated with the another file to the activity service for storing the generated activity metadata; and
obtain, from the activity service, at least one activity and corresponding activity metadata associated with the another file for display within a file activity feed of the another file.

10. The computer-implemented method of claim 9, wherein the file is stored on the client computing device.

11. The computer-implemented method of claim 9, wherein the file is stored on the first cloud storage provider.

12. The computer-implemented method of claim 11, wherein the second file is stored on the second cloud storage provider.

13. The computer-implemented method of claim 12, wherein the second cloud storage provider is independent of the activity service and the first cloud storage provider.

14. A system comprising:
at least one processor; and
memory encoding computer executable instructions that, when executed by the at least one processor, perform a method for storing activity metadata in an activity service, the method comprising:
receiving, at the activity service, activity metadata corresponding to at least one activity associated with a file stored on a first cloud storage provider;
storing, at the activity service, the activity metadata corresponding to the at least one activity associated with the file stored on the first cloud storage provider, where the first cloud storage provider is independent of the activity service;
receiving, at the activity service, activity metadata corresponding to at least one activity associated with another file stored on a second cloud storage provider;
storing, at the activity service, the activity metadata corresponding to the at least one activity associated with the another file stored on the second cloud storage provider, where the second cloud storage provider is independent of the activity service and a different cloud storage provider than the first cloud storage provider;
generating, at the activity service, activity metadata corresponding to a plurality of activities associated with the file stored on the first cloud storage provider;
sending the generated activity metadata to the first cloud storage provider;

generating, at the activity service, activity metadata corresponding to a plurality of activities associated with the another file stored on the second cloud storage provider; and sending the generated activity metadata to the second cloud storage provider.

15. The system of claim 14, further comprising:
receiving, from a third party entity, a request for activity metadata corresponding to a plurality of activities associated with the file stored on the first cloud storage provider; and sending the requested activity metadata to the third party entity, wherein the third party entity is independent of the activity service, the first cloud storage provider, and the second cloud storage provider.

16. The system of claim 14, wherein the file stored on the first cloud storage provider has a first global identifier, and wherein the another file stored on the second cloud storage provider has a second global identifier.

17. The system of claim 14, wherein the activity service stores activity metadata corresponding to a plurality of activities associated with a plurality of files stored on a plurality of cloud storage providers.

18. The system of claim 14, further comprising:
receiving, at the activity service, activity metadata corresponding to at least one activity associated with another file stored on a third cloud storage provider; and storing the activity metadata corresponding to the at least one activity associated with the another file stored on the third cloud storage provider.

19. The system of claim 18, wherein the third cloud storage provider is independent of the activity service and a different cloud storage provider than the first cloud storage provider and the second cloud storage provider.

20. The system of claim 18, further comprising:
generating, at the activity service, activity metadata corresponding to a plurality of activities associated with the another file stored on the third cloud storage provider; and sending the generated activity metadata to the third cloud storage provider.

* * * * *